UNITED STATES PATENT OFFICE.

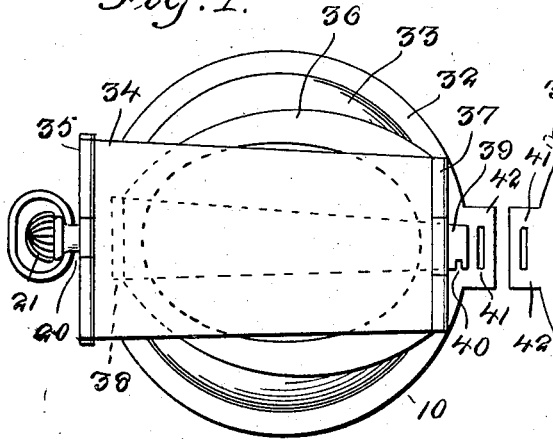
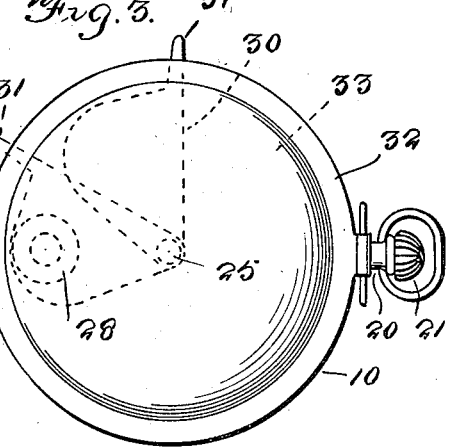
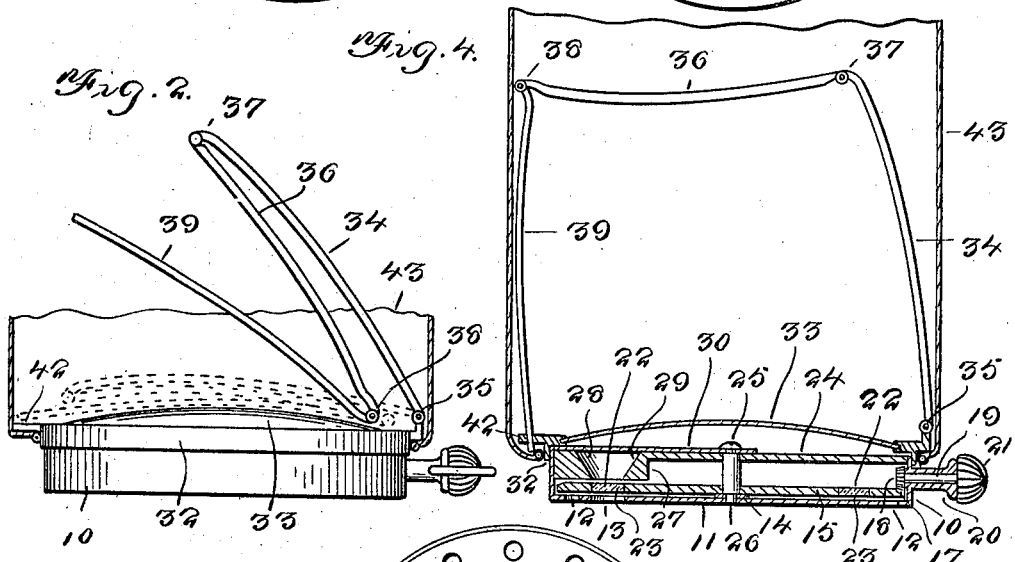
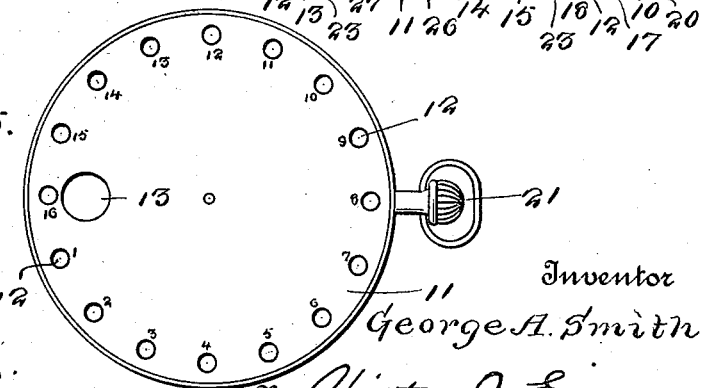

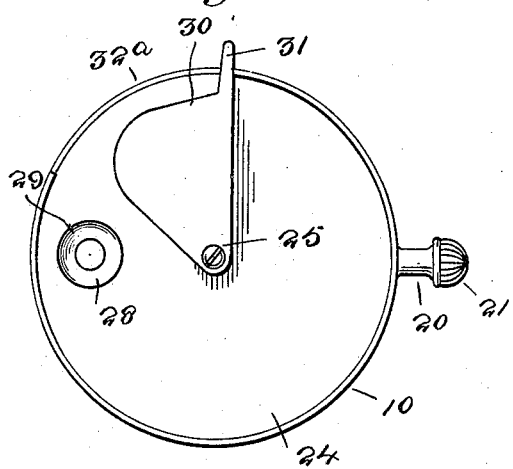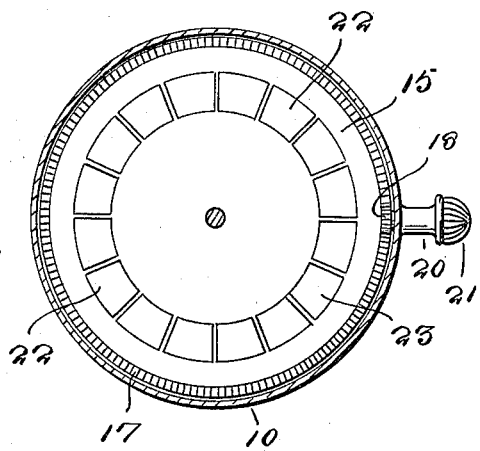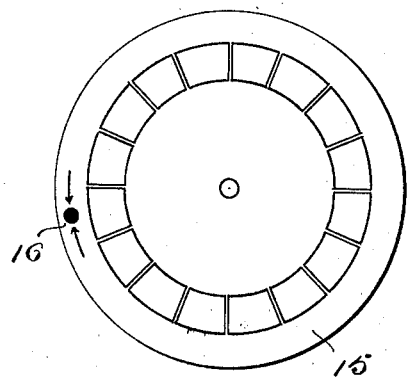

GEORGE A. SMITH, OF BALTIMORE, MARYLAND.

EXPOSURE-METER.

1,310,256.  Specification of Letters Patent.  Patented July 15, 1919.

Application filed September 21, 1918. Serial No. 255,089.

*To all whom it may concern:*

Be it known that I, GEORGE A. SMITH, a citizen of the United States, residing at Baltimore, in the State of Maryland, have invented new and useful Improvements in Exposure-Meters, of which the following is a specification.

This invention relates to exposure meters for photographic work and has for its object the provision of a devise whereby the correct exposure under different light conditions for shutters or diaphragms having different openings may be ascertained, the construction of the device being such that the specific light conditions may be tested in comparison with a fixed or known light value, the device being used in conjunction with a guide chart bearing the proper corresponding data.

An important and more specific object is the provision of a device in the nature of a casing, preferably of approximately watch size, provided with a sight opening surrounded by a luminous area constituting the known light value, the sight opening having registrable therewith other openings covered by translucent material of different color densities formed in a disk rotatable within the casing, the specific light conditions being ascertained by comparison of its effect upon the different covered openings with the fixed light value, this comparison guiding the operator in the adjustment of the lens diaphragms.

Another object is the provision of a device of this character emodying a peculiarly constructed shield for excluding extraneous light while making the test, this shield being foldable to lie normally upon the casing to provide a compact structure.

Another object is the provision of a device of this character which will be simple and inexpensive in manufacture, efficient and durable in use, and a general improvement in the art.

With the above and other objects and advantages in view, the invention consists in the details of construction to be hereinafter more fully described and claimed, and illustrated in the accompanying drawings in which:

Figure 1 is a plan view of the device with the shield in folded position.

Fig. 2 is a side elevation thereof showing the shield in partly folded position by solid lines and in entirely folded position by dotted lines, the leather guard being shown in section.

Fig. 3 is a plan view of the device with the shield entirely removed.

Fig. 4 is a longitudinal sectional view through the device with the shield in extended position.

Fig. 5 is a bottom plan view.

Fig. 6 is a horizontal sectional view taken immediately above the stationary disk.

Fig. 7 is a horizontal sectional view taken immediately above the movable disk and Fig. 8 is a bottom plan view of the movable disk.

Fig. 9 is a view of a chart used in conjunction with the device.

Referring more particularly to the drawing the numeral 10 designates a casing which is circular in shape and which is similar in size and construction to an ordinary watch case. The bottom 11 of the case is provided adjacent its edge with a series of circular holes 12 numbered consecutively from "1" to "16". The bottom is further provided with a larger hole 13 arranged adjacent the hole numbered "16."

Disposed within the casing 10 and spaced from the bottom 11 by a washer 14 is a rotatable disk 15 provided on its underside adjacent its periphery with a circular black spot 16 adapted to be brought into registration with and be visible through one of the holes 12 in the bottom 11. Upon its upper side, the disk 15 has formed at its periphery gear teeth 17 with which meshes a pinion 18 carried by a small shaft 19 extending through a stem 20 disposed on one side of the casing 10. The shaft 19 is provided at its outer end with a knurled head 21 whereby it may be conveniently grasped by the operator and rotated so that the disk 15 may be rotated. Formed in the disk 15 is a circumferential series of openings 22 corresponding in number to the number of openings 12 in the bottom 11 and these openings are covered by pieces 23 of translucent material which are all of the same color but which are successively of increasing densities.

Secured within the upper portion of the casing 10 is a stationary disk 24 through the center of which is threaded a screw 25 having a reduced end 26 extending through the disk 15 and washer 14, and serving as a journal for the disk 15. Formed on the underside of the stationary disk 24 at a point opposite the stem 20 is an enlargement 27 the lower side of which is disposed in slightly spaced relation to the movable disk 15. This enlargement 27 is provided with a hole 28 having beveled sides 29 which are coated with some self-luminous material. The position of the opening 28 is such that it registers with the hole 13 in the bottom 11 and with any one of the openings 22 in the movable disk 15.

Disposed upon the stationary disk 24 is a shield 30 formed as a segmental shaped plate pivoted at one end upon the screw 25 and provided at its other end with a finger engaging tongue 31 extending through a slot 32ª in the casing 10 whereby the shield may be swung upon the screw 25 as a pivot so that it may either be disposed over the opening 28 or be swung into non-obstructing relation thereto.

The upper outer edge of the casing 10 is threaded for engagement thereon of a rim 32 which carries a crystal 33 forming a closure for the top of the casing.

The light excluding shield comprises a strip of material 34 hingedly connected at 35 upon the rim 32 adjacent the stem 20 and further includes a preferably oval or elliptical frame 36 hingedly connected at 37 with the other end of the strip of material 34. Opposite the point 37, the frame 36 has hingedly connected therewith as shown at 38 a second strip 39 which has its free end notched as shown at 40 for retention within a slot 41 formed in an ear 42 extending from the rim 32 at a point diametrically opposite the point of hinging 35. Disposed about and secured to the strips 34 and 39 is a substantially cylindrical shield 43 of some suitable flexible material which has its free end extending beyond the frame 36 and so shaped as to conformingly engage the face of the operator around his eye.

The operation of the device is as follows: The foldable shield is moved from its collapsed position as shown in dotted lines in Fig. 2 to its extended position as shown in Fig. 4 and the notched end 40 of the strip 39 is engaged within the slot 41 in the ear 42 so that the shield will be secured in its extended position. The operator then places the open end of the leather covering of the shield against his eye and points the device toward the object to be photographed. He then grasps the knurled head 21 between his fingers and rotates it so that the disk 15 will be rotated bringing the different openings 22 covered by the translucent pieces of material 23 successively beneath or in registration with the opening 28 which has its beveled sides coated with the luminous material. It is understood of course that it is first necessary to swing the shield plate 30 into non-obstructing relation to the opening 28, as shown by dotted lines in Fig. 3. The operator rotates the disk 13 by means of the shaft 19 until the translucent piece of material 23 of the proper density registers with the opening 28. This is ascertained by noting whether or not the light entering the casing through the hole 13 and the registering piece of material 23 blends with the light given off by the self-luminous coating of the beveled walls 29 of the opening 28. If a too dense translucent strip 23 is brought into registration with the hole 13 and opening 28 a dark spot will be seen when the operator gazes into the opening 28. If a sheet 23 of too little density is brought into registration with the hole 13 and opening 28, the center of the opening 28 will appear brighter than the luminous coated beveled sides thereof. It will therefore be seen that the disk 15 must be manipulated so that the proper one of the sheets 23 will be brought into registration with the hole 13 and opening 28 the proper sheet being that one which permits a degree of light to enter the opening 28 exactly equal to and blending with the light given off from the luminous coating of the beveled sides of the opening 28. The operator then inspects the back or bottom of the casing and notes through which one of the holes 12 the black spot 16 is visible. He then notes the number adjacent the hole through which the spot is visible and refers to the chart shown in Fig. 9 which gives the proper data for determining the size of diaphragm opening to be used under the specific light conditions.

When the use of the device is not desired, the shield plate 30 is swung upon the screw 25 so that it will be disposed over the opening 28 and the eye guard or light excluding member is folded by disengaging the notched end 40 of the strip 39 from within the slot 41 and then collapsing the elements of this member as shown in Fig. 2. The size and shape of the device is such that it may be conveniently carried in the pocket of the user and will be very compact.

From the foregoing description and a study of the drawing it will be apparent that I have thus provided an extremely simple and efficient means whereby light may be tested so that the proper exposure may be ascertained to meet varying conditions.

While I have shown and described the preferred embodiment of the invention, it will of course be readily understood that I reserve the right to make such changes, in the form, construction and arrangement of parts as will not depart from the spirit of the invention nor the scope of the subjoined claims.

Having thus described my invention I claim:—

1. A device of the character described comprising a casing, a fixed disk within said casing, provided with an opening having beveled sides coated with luminous material, a disk rotatable within said casing, means for rotating said second named disk, and means carried by said rotatable disk for regulating the intensity of light entering said opening.

2. A device of the character described comprising a casing, said casing being provided in its bottom with a hole, a fixed disk within said casing and provided with an opening, registering with said hole and having beveled sides coated with luminous material, a disk rotatable within said casing between the bottom thereof and said fixed disk, means for rotating said rotatable disk, and means carried by said rotatable disk for varying the intensity of light entering said bevel sided opening through said hole.

3. A device of the character described comprising a casing, the bottom of said casing being provided with a hole, a fixed disk within said casing and provided with an opening registering with said hole and having beveled sides coated with luminous material, a rotatable disk within said casing between the bottom thereof and said fixed disk, said rotatable disk being provided with a circumferential series of holes covered by sheets of material of successively increasing density, and means for rotating said second named disk.

4. A device of the character described comprising a casing provided in its bottom with a hole and further provided in its bottom with a circumferential series of holes, a fixed disk within said casing and provided with an opening registering with said first named hole and having beveled sides coated with luminous material, a rotatable disk within said casing between the bottom thereof and said fixed disk, said rotatable disk being provided with a circumferential series of openings, sheets of material of successively increasing density covering said last named holes, means for rotating said rotatable disk whereby said sheet may be successively brought into registration with said first named hole and said bevel sided opening, the side of said rotatable disk adjacent said bottom bearing thereon a guide spot visible through said first named circumferential series of holes.

5. A device of the character described comprising a casing provided in its bottom with a hole, a fixed disk within said casing and provided with an opening registering with said hole and having beveled sides coated with luminous material, a rotatable disk within said casing between the bottom thereof and said fixed disk, said rotatable disk carrying means for varying the intensity of light entering said bevel sided opening through said hole, and a collapsible light excluding shield connected with the casing.

6. A device of the character described comprising a casing, the bottom of said casing being provided with a hole and being further provided with a circumferential series of holes, a fixed disk within said casing, an enlarged portion on the lower side of said fixed disk provided with an opening having beveled sides coated with luminous material, said opening registering with said first named hole, a plate pivoted upon said fixed disk and movable to be disposed selectively over said opening or in non-obstructing relation thereto, a rotatable disk within said casing between the bottom thereof and the lower edge of said enlargement, said rotatable disk being provided with a circumferential series of holes adapted to register with said first named hole and said opening, sheets of material of successively increasing density disposed over said last named series of circumferential holes, means for rotating said rotatable disk whereby said sheets may be successively brought into registration with said first named hole and said opening, the side of said rotatable disk adjacent said bottom being provided with a guide spot visible through said first named series of holes, a crystal disposed over said second disk and forming a closure for said casing, and a light excluding shield connected with said casing.

In testimony whereof I affix my signature.

GEORGE A. SMITH.

Copies of this patent may be obtained for five cents each, by addressing the "Commissioner of Patents, Washington, D. C."